United States Patent [19]

Hammar et al.

[11] Patent Number: 5,436,900
[45] Date of Patent: Jul. 25, 1995

[54] TRANSCODER AND IMPROVED LAND SYSTEM FOR A MOBILE RADIO COMMUNICATION SYSTEM

[75] Inventors: Claes L. Hammar, Täby; Walter Ghisler, Upplands Väsby; Gunnar Burström, Kista, all of Sweden; Per J. H. Tjernlund, Apex, N.C.

[73] Assignee: Telefonaktiebolaget LM Ericsson, Stockholm, Sweden

[21] Appl. No.: 125,136

[22] Filed: Sep. 23, 1993

Related U.S. Application Data

[63] Continuation of Ser. No. 828,574, Jan. 31, 1992, abandoned.

[30] Foreign Application Priority Data

Jan. 31, 1991 [SE] Sweden .................. 9100309

[51] Int. Cl.⁶ .......................... H04L 29/02
[52] U.S. Cl. ...................... 370/83; 370/118; 375/240; 455/33.1
[58] Field of Search ........ 370/79, 118, 82, 83; 381/29–32; 379/58, 59; 455/33.1; 375/27–33, 122

[56] References Cited

U.S. PATENT DOCUMENTS

| | | | |
|---|---|---|---|
| 4,287,577 | 9/1981 | Deal, Jr. ...................... | 365/233 |
| 4,675,863 | 6/1987 | Paneth et al. ................. | 379/59 X |
| 4,718,057 | 1/1988 | Venkitakrishnan et al. .... | 370/55 |
| 4,759,016 | 7/1988 | Otsuka .......................... | 370/95 |
| 4,777,633 | 10/1983 | Fletcher et al. .............. | 370/50 |
| 4,839,897 | 6/1989 | Aoki ............................. | 371/68 |
| 4,856,048 | 8/1989 | Yamamoto et al. ........... | 379/60 |
| 5,077,741 | 12/1991 | Kotzin .......................... | 455/33.1 X |
| 5,111,454 | 5/1992 | Hung et al. ................... | 370/95.3 |

FOREIGN PATENT DOCUMENTS

| | | | |
|---|---|---|---|
| 0120718 | 3/1984 | European Pat. Off. ........ | H04Q 7/04 |
| 3525898 | 11/1988 | Germany ....................... | H03M 7/30 |
| 2174571 | 11/1986 | United Kingdom ........... | H04Q 7/04 |
| WO8606915 | 11/1986 | WIPO ............................ | H04Q 7/04 |

OTHER PUBLICATIONS

*Modern Communications Switching Systems—2nd Edition,* by Marvin Hobbs, pp. 28–31.

Primary Examiner—Benedict V. Safourek
Assistant Examiner—Russell W. Blum
Attorney, Agent, or Firm—Burns, Doane, Swecker & Mathis

[57] ABSTRACT

The invention relates to a multi transcoder for simultaneous coding/decoding of a plurality of traffic channels in a mobile radio communication system. The multi transcoder comprises several digital signal processors for time multiplex coding/decoding of several traffic channels. The invention also relates to a land system in which a switch is provided between the radio equipment of the base stations and transcoder equipment associated therewith.

22 Claims, 2 Drawing Sheets

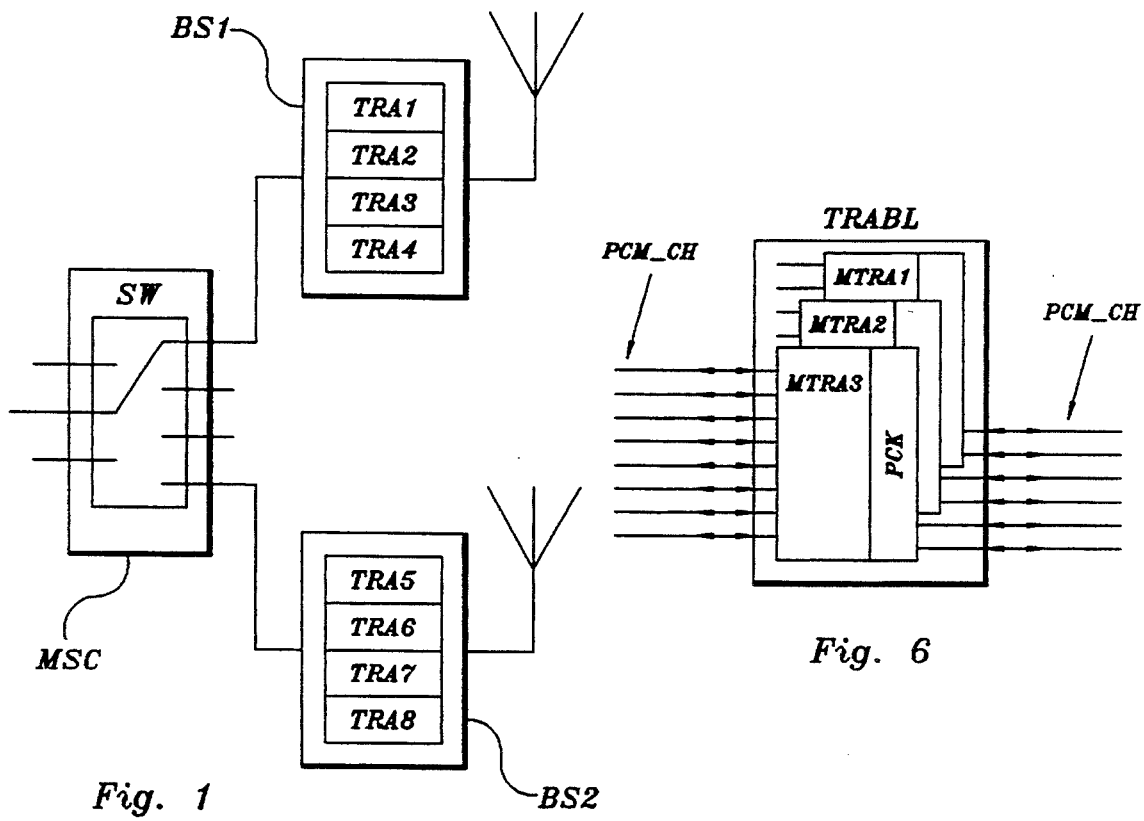
Fig. 1
Fig. 6
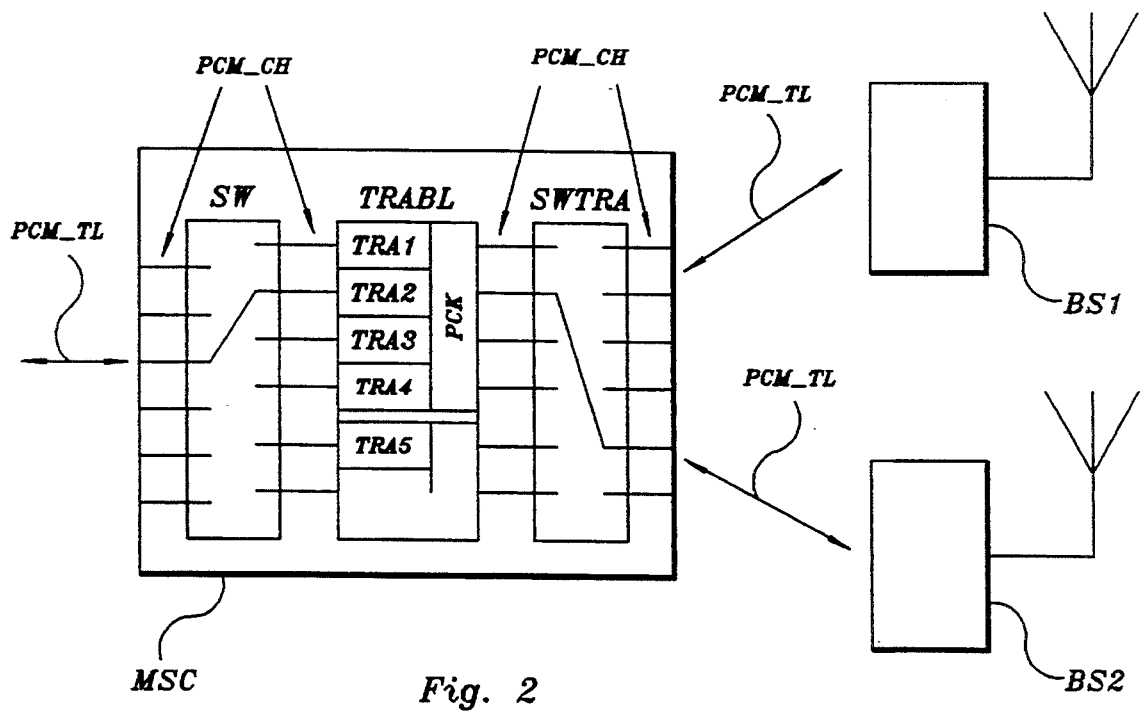
Fig. 2

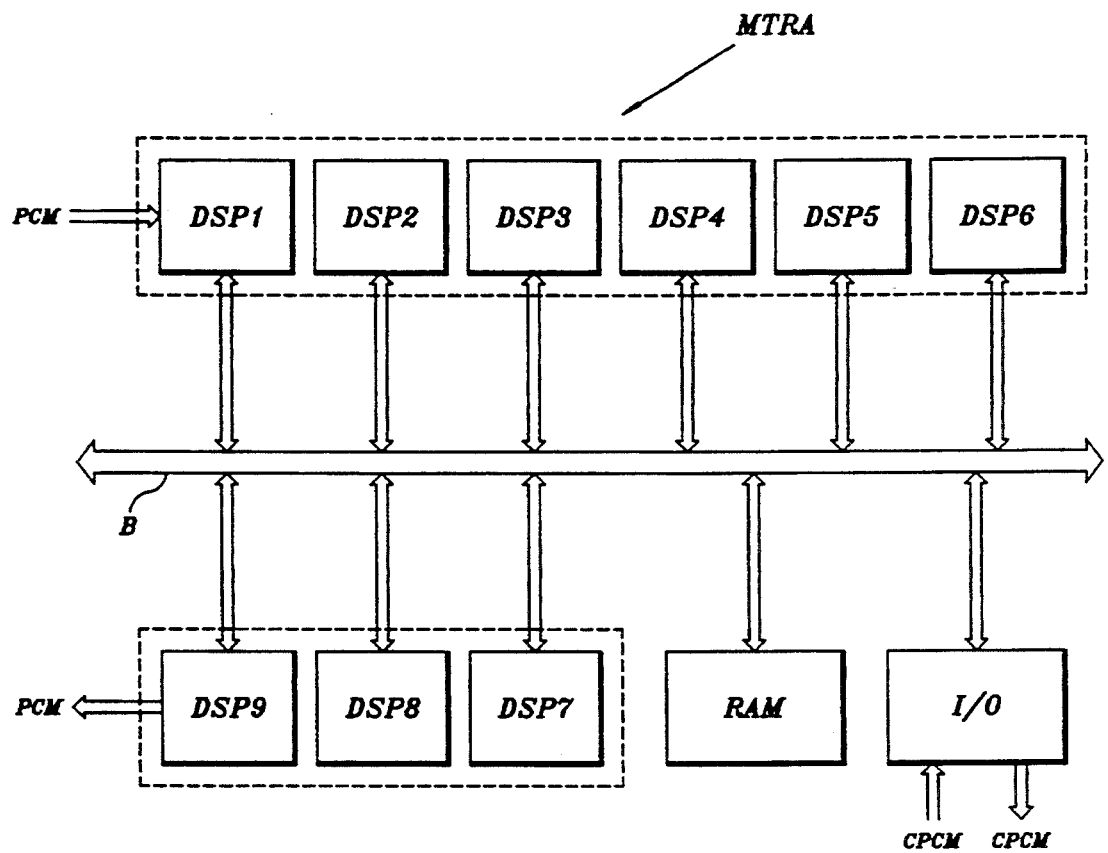
Fig. 3
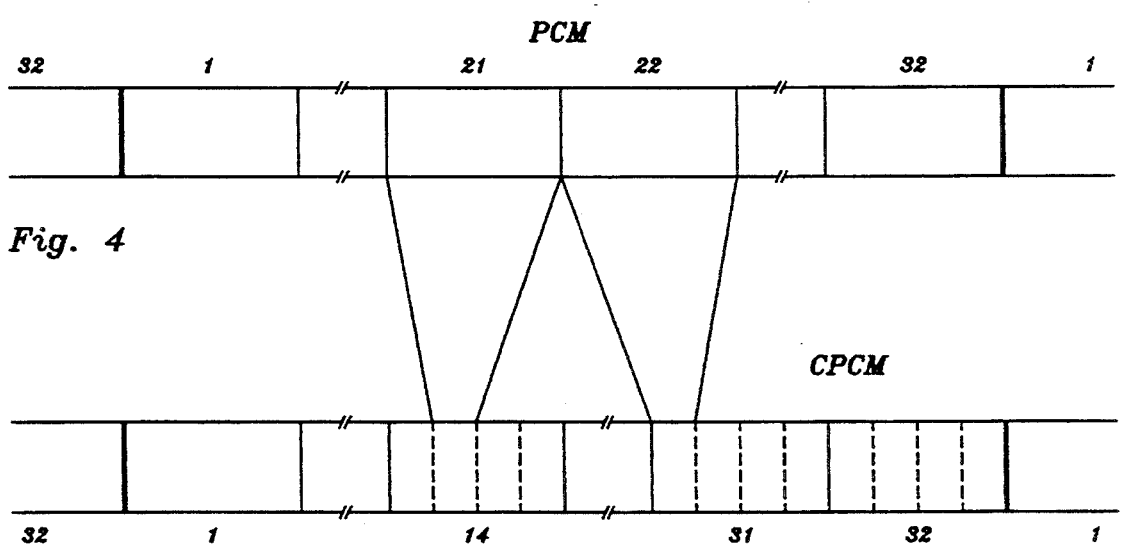
Fig. 4
Fig. 5

TRANSCODER AND IMPROVED LAND SYSTEM FOR A MOBILE RADIO COMMUNICATION SYSTEM

This application is a continuation of application Ser. No. 07/828,574, filed Jan. 31, 1992, now abandoned.

TECHNICAL FIELD

The present invention relates to a transcoder and an improved land system for a mobile radio communication system.

PRIOR ART

In mobile radio communication systems it is known to use a so called transcoder for coding/decoding of information between a pulse code modulated form and more compact pulse code modulated form suitable for radio transmission. Such transcoder equipment is provided in the land system of the radio communication system. From U.S. Pat. Nos. 4,675,863 and 4,777,633 it is previously known to provide each traffic channel with its own transcoder in the land system. This transcoder usually is located in or in connection to one of the base stations of the land system. This is a costly solution since all traffic channels seldom are simultaneously occupied and expensive transcoder equipment thus is not utilized during long time periods.

Recently it has also been suggested to move the transcoder equipment from the base station to the mobile services switching center in order to reduce the transfer rate between the base station and the mobile services switching center to the lower transfer rate that is obtained in the radio connection due to the more compact pulse code modulated form of the signal.

SUMMARY OF THE INVENTION

An object of the present invention is to provide a transcoder that is capable of processing several traffic channels simultaneously. Such an apparatus could be called a multi-transcoder.

This object is achieved by a transcoder for coding/decoding of information between a pulse code modulated form and a more compact pulse code modulated form suitable for radio transmission and which comprises means for time multiplex coding/decoding of a predetermined number of traffic channels.

Another object of the invention is to provide an improved land system that better utilizes the available transcoder capacity.

This object is achieved by a land system for a mobile radio communication system, which comprises transcoders for coding/decoding of information between a pulse code modulated form and a more compact pulse code modulated form suitable for radio transmission, and wherein a switch is provided between at least one set of transcoders and corresponding radio equipment in the base stations of the land system.

A further object of the invention is such an improved land system in which the transcoders in accordance with the present invention are utilized.

This object is achieved by a land system for a mobile radio communication system, which comprises means for coding/decoding of information between a pulse code modulated form and a more compact pulse code modulated form suitable for radio transmission, wherein at least some of said means for coding/decoding of information comprise a transcoder with means for time multiplex coding/decoding of a predetermined number of traffic channels and wherein a switch is provided between at least one set of such transcoders and corresponding radio equipment in the base stations of the land system.

SHORT DESCRIPTION OF THE DRAWINGS

The invention, further objects and advantages obtained by the invention are best understood by reference to the following description and the accompanying drawings, in which:

FIG. 1 shows the simplified structure of a known land system for a mobile radio communication system;

FIG. 2 shows the structure of a land system for a mobile radio communication system in accordance with the present invention;

FIG. 3 shows the structure of a transcoder designed in accordance with the present invention;

FIG. 4 shows the format of a time division pulse code modulated signal;

FIG. 5 shows the format of the compressed pulse code modulated signal; and

FIG. 6 shows a preferred embodiment of a transcoder block in the land system of FIG. 2.

PREFERRED EMBODIMENT

Throughout the Figures the same reference designations are used for corresponding elements.

The conventional land system of a mobile radio communication system shown in FIG. 1 comprises a mobile services switching center MSC, to which two base stations BS1 and BS2 are connected. The other side of the mobile services switching center is connected to the public telephone net by a switch SW. Each base station is allocated a number of radio frequencies, which are further divided into a number of traffic channels through time division. Before information is sent over a traffic channel it is coded or compressed in a transcoder TRA1-TRA8 in accordance with a procedure such as that described in GSM recommendation 06.10. Information received over the traffic channel is decoded or expanded in the same transcoder. In the conventional land system, each traffic channel is allocated its own transcoder for this coding/decoding. However such a solution is costly since all traffic channels in all base stations seldom are simultaneously occupied and expensive transcoder equipment thus often is not utilized.

FIG. 2 shows the structure of a land system for a mobile radio communication system in accordance with the present invention. In accordance with the invention, the transcoders that previously were located in base stations BS1 and BS2 have been moved to a transcoder block TRABL in the mobile services switching center MSC, and a switch SWTRA has been provided between base stations BS1, BS2 and transcoder block TRABL. The other side of transcoder block TRABL is connected to switch SW, which corresponds to switch SW in FIG. 1, and thus is connected to the public telephone net.

This design has several advantages. One advantage is that the transmission rate between base stations BS1, BS2 and mobile services switching center MSC has been reduced since the information still is compressed over this distance. Another advantage is that the previously necessary allocation of one transcoder for each traffic channel has been eliminated. Instead, transcoder block TRABL now comprises a common resource that is shared by all the traffic channels. A certain traffic channel can therefore at one time by means of the switch SWTRA be associated with one transcoder in the transcoder block TRABL and at a later time be associated with another transcoder in the block.

An important advantage of the suggested design is that the number of transcoders in the block TRABL can be reduced to the expected demand. The number of transcoders in the block TRABL can therefore be less than the number of traffic channels available for base stations BS1, BS2. In other words, the switch SWTRA forms a concentrator that associates occupied traffic channels with available transcoders in the transcoder block TRABL, while nonoccupied traffic channels are not associated with a transcoder.

In FIG. 2 the switches SW and SWTRA have for the sake of clearness been shown as two separate switches. However, in a preferred embodiment these switches have been integrated into a common switch. In such an embodiment, the signal passes the switch twice, once in compressed form and once in expanded form.

In FIG. 2, the switch SWTRA and the transcoder block TRABL have been provided in the mobile services switching center MSC. Another embodiment of the present invention consists of providing switch SWTRA and transcoder block TRABL nearer to the base stations or even within the same. In such an embodiment, however, a switch is required for each base station and the advantage of reduced transfer rate between base station and mobile services switching center is lost.

FIG. 3 shows an embodiment of a transcoder designed in accordance with the present invention and suitable to be used in the land system of FIG. 2.

The transcoder, in FIG. 3, will be described with reference to the GSM standard, but the principles are also applicable for other standards, e.g. the American standard IS-54.

In the European PCM-standard, a transmission link transfers 2048 Mb/s distributed over 32 channels, of which 30 are speech channels, see FIG. 4. Each speech channel transfers 64 kb/s in each direction, which corresponds to a speech connection in the public telephone net. Each such PCM speech channel is compressed in a transcoder to a more compact form by waiting for 1280 bits of PCM code (=20 ms speech) and recoding these bits to a maximum of 320 bits (to 260 bits in the American standard). The block of 320 bits in which this compressed signal is stored is packed into a common PCM speech channel together with 3 similar blocks of 320 bits corresponding to 3 other compressed PCM speech channels. This is done by using 2 bits per PCM time slot in accordance with FIG. 5. Channel 1, which is intended for synchronisation, and channel 16, which is intended for signalling, are not compressed but are unchanged in the format shown in FIG. 5. The total length of a frame comprising 32 time slots is 125 μs in both FIG. 4 and FIG. 5. Thus, the result of the compression is that each time slot in FIG. 5, which is intended for the transfer of speech will contain information from 4 time slots in FIG. 4. Otherwise the 32 time slots in FIG. 5 are treated in the same way as the 32 time slots in FIG. 4, i.e. they still form a frame in a transmission link comprising 32 channels.

In FIG. 2, the transmission links have been designated PCM_TL while the PCM channels have been designated PCM_CH. The packing/separation of the compressed code is performed in a unit PCK.

The speech coding/decoding algorithm in the GSM standard comprises a number of blocks that are described in GSM recommendation 06.10. However, these blocks are speech frame oriented, i.e., each block must perform calculations on a whole or a predetermined portion of a speech frame before the next block of the algorithm can take over. This fact has been utilized in the transcoder illustrated in FIG. 3. Here digital signal processors DSP1–DSP6 are used for coding and digital signal processors DSP7–DSP9 are used for decoding of the signals.

The pulse code modulated signal PCM of FIG. 4 reaches the coding section, which is comprised of the digital signal processors DSP1–DSP6. The different processors have been allocated the following algorithm blocks in GSM recommendation 06.10:

DSP1 preprocessing
DSP2 short term LPC analysis
DSP3 short term analysis filter
DSP4 RPE grid selection and coding
DSP5 LTP-analysis
DSP6 PRE grid decoding and positioning, long term analysis filter.

The operation is as follows: PCM signal reaches the first digital signal processor DSP1. The speech frame of the first channel, i.e. 1280 bits of PCM code, is read into a memory RAM over bus B. The first speech frame is processed in digital signal processor DSP1 for performing the first algorithm block "preprocessing". Data that is to be processed is fetched from said RAM and the final result is stored in the same RAM. Simultaneously data for the next speech frame is read into the RAM. Thereafter, the digital signal processor DSP1 performs the same operations on this speech frame. In parallel herewith, DSP2 fetches data which has been processed by the digital signal processor DSP1 from the RAM over bus B and performs algorithm block "short term LPC analysis" on this data. The result is once again transferred to the RAM.

In this way, the first speech frame is processed by all of the digital signal processors DSP1–DSP6, one after the other. After each step, the result is transferred to the RAM to be fetched by the next digital signal processor in the chain. At the same time, the following speech frames are processed in sequence in the same way by the other digital signal processors. When the whole coding algorithm has been performed for the eight speech frames the compressed pulse modulated code CPCM can be fetched from RAM by an interface unit I/O for further transfer to a base station.

The decoding of coded information is performed in a similar way in the digital signal processors DSP7–DSP9. These processors perform the following algorithm blocks:

DSP7 RPE grid decoding and positioning, long time synthesis filter
DSP8 short term synthesis filter
DSP9 post processing.

The embodiment of a transcoder in accordance with the present invention described in FIG. 3 is characterized by parallel processing of speech frames for several channels, each digital signal processor performs a specific algorithm block on the speech frame of each channel. If an algorithm block is especially time consuming, it is, however, possible to let two or more of the digital signal processors to perform one portion of the algorithm block. Still another possibility is to use two identical signal processors that perform the same algorithm block, but on different speech channels. For example, the first processor can process odd speech frames, while the second processes even speech frames. Hereby time critical algorithm blocks can be speeded up. Combinations of these embodiments are also possible.

An essential advantage of the suggested transcoder is that the included digital signal processors can be optimized for the algorithm block they are intended to implement. For example, some of the processors can be 8 bit processors, while other processors can be 16 bit processors. In known transcoders for processing only one traffic channel, there is no such flexibility, but a compromise has to be done as regards desired processing speed and word length for the digital signal processor of the transcoder.

Since, the different digital signal processors DSP1-DSP9 do not have to be general processors, but only are intended to perform very specific algorithm blocks, it is also possible to tailor each processor for its respective algorithm block. This means that the processors can be significantly simplified as compared to general purpose processors. This feature in turn can be used for integrating the whole transcoder for, say, eight traffic channels in a VLSI circuit.

Still another advantage of the transcoder in accordance with the present invention is a reduced delay. A conventional transcoder for the GSM system, which uses 8 traffic channels per radio frequency, causes a delay of approximately 7 ms in connection with coding to compact form. The corresponding delay in the transcoder in accordance with the present invention is approximately 2 ms.

FIG. 6 shows a preferred embodiment of a transcoder block TRABL suitable for use in the land system of FIG. 2. Transcoder block TRABL comprises a suitable number of groups of transcoders in accordance with the present invention. In the example, each group is comprised of three transcoders. The first group comprises the transcoders MTRA1, MTRA2, MTRA3. Here the letter "M" in the reference designation refers to a "multi" transcoder in accordance with FIG. 3. The right side of each multi-transcoder outputs/receives compressed pulse code modulated CPCM code, which in the present case comprises eight 2 bit channels packed in two 64 kb/s PCM channels. The output and input signals of the left side of each multi transcoder comprises eight 64 kb/s PCM channels.

In a preferred embodiment of the land system of the present invention, in which a transcoder block of FIG. 6 is used, the concentration described in connection with FIG. 2 is obtained since the number of multi-transcoder is less than the number of radio frequencies, alternatively the number of traffic channels divided by 8, available for the base stations that are connected to the transcoder block.

It is obvious for the man skilled in the art that different changes and modificantions of the present invention are possible without departure from the scope of the present invention, which is defined by the accompanying claims.

We claim:

1. A transcoder in the land system of a mobile radio communication system, intended for coding information between a pulse code modulated form and a more compact pulse code modulated form suitable for radio transmission, comprising a plurality of means for coding a predetermined number of traffic channels, wherein each of said means performs a different operation of said coding, and each means performs its specific operation on each traffic channel, wherein after each means has performed its specific operation on one traffic channel each means can perform its specific operation on another traffic channel so that a plurality of traffic channels can be coded simultaneously.

2. The transcoder according to claim 1, wherein the traffic channels are associated with the same radio frequency.

3. The transcoder according to claim 1, comprising at least one digital signal processor for coding information in the time slots of the traffic channels.

4. The transcoder according to claim 3, wherein three traffic channels are processed by said at least one digital signal processor.

5. The transcoder according to claim 3, wherein eight traffic channels are processed by said at least one digital signal processor.

6. A transcoder in the land system of a mobile radio communication system, intended for decoding information between a pulse code modulated form and a more compact pulse code modulated form suitable for radio transmission, comprising a plurality of means for decoding of a predetermined number of traffic channels, wherein each of said means performs a different operation of said decoding, and each means performs its specific operation on each traffic channel, wherein after each means has performed its specific operation on one traffic channel each means can perform its specific operation on another traffic channel so that a plurality of traffic channels can be decoded simultaneously.

7. The transcoder according to claim 6, wherein the traffic channels are associated with the same radio frequency.

8. The transcoder according to claim 6, comprising at least one digital signal processor for decoding information in the time slots of the traffic channels.

9. The transcoder according to claim 8, wherein three traffic channels are processed by said at least one digital signal processor.

10. The transcoder according to claim 8, wherein eight traffic channels are processed by said at least one digital signal processor.

11. A land system for a mobile radio communication system with at least one traffic channel, comprising a plurality of transcoders, wherein each transcoder contains a plurality of means wherein said means performs a different coding operation on each traffic channel for coding information between a pulse code modulated form and a more compact pulse code modulated form suitable for radio transmission, wherein a switch is provided between at least one set of transcoders and corresponding radio equipment in the base stations of the land system.

12. The land system according to claim 11, wherein the number of transcoders connected to the switch is less than the number of traffic channels that are available to each of the base stations connected to the switch.

13. The land system according to claim 12, wherein the transcoders and the corresponding switch are provided in a mobile services switching center.

14. A land system for a mobile radio communication system with at least one traffic channel, comprising a plurality of transcoders wherein each transcoder contains a plurality of means wherein each means performs a different decoding operation on each traffic channel for decoding information between a pulse code modulated form and a more compact pulse code modulated form suitable for radio transmission, wherein a switch is provided between at least one set of transcoders and corresponding radio equipment in the base stations of the land system.

15. The land system according to claim 14, wherein the number of transcoders connected to the switch is less than the number of traffic channels that are available to each of the base stations connected to the switch.

16. The land system according to claim 15, wherein the transcoders and corresponding switch are provided in a mobile services switching center.

17. A land system for a mobile radio communication system, comprising a plurality of means for coding information between a pulse code modulated form and a more compact pulse code modulated form suitable for radio transmission, wherein at least some of said means for coding information contain a transcoder with first means for coding a predetermined number of traffic channels, each of said first means performs a different operation of said coding, wherein the different operations of the coding are time multiplexed, and each first means performs its specific operation on each traffic channel and wherein a switch is provided between at least one set of such transcoders and corresponding radio equipment in the base stations of the land system.

18. The land system according to claim 17, wherein the number of transcoders connected to the switch is less than the number of traffic channels that are available to each of the base stations connected to the switch.

19. The land system according to claim 18, wherein the transcoders and corresponding switch are provided in a mobile services switching center.

20. A land system for a mobile radio communication system, comprising a plurality of means for decoding information between a pulse code modulated form and a more compact pulse code modulated form suitable for radio transmission, wherein at least some of said means for decoding information contain a transcoder with first means for decoding a predetermined number of traffic channels, each of said first means performs a different operation of said decoding, wherein the different operations of the decoding are time multiplexed, and each first means performs its specific operation on each traffic channel and wherein a switch is provided between at least one set of such transcoders and corresponding radio equipment in the base stations of the land system.

21. The land system according to claim 20, wherein the number of transcoders connected to the switch is less than the number of traffic channels that are available to each of the base stations connected to the switch.

22. The land system according to claim 21, wherein the transcoders and corresponding switch are provided in a mobile services switching center.

* * * * *